United States Patent
Frigo et al.

(12) 
(10) Patent No.: US 6,498,673 B1
(45) Date of Patent: Dec. 24, 2002

(54) MICRO-MACHINED TUNABLE DELAY LINE

(75) Inventors: Nicholas J. Frigo, Red Bank, NJ (US); Evan L. Goldstein, Princeton, NJ (US); Lih-Yuan Lin, Little Silver, NJ (US); Chuan Pu, Middletown, NJ (US); Robert William Tkach, Little Silver, NJ (US)

(73) Assignee: AT&T Corp., New York, NY (US)

( * ) Notice: Subject to any disclaimer, the term of this patent is extended or adjusted under 35 U.S.C. 154(b) by 29 days.

(21) Appl. No.: 09/754,616

(22) Filed: Jan. 4, 2001

Related U.S. Application Data
(60) Provisional application No. 60/177,025, filed on Jan. 19, 2000.

(51) Int. Cl.[7] ............................................. G02F 1/03
(52) U.S. Cl. ..................................................... 359/246
(58) Field of Search .................................. 359/122, 246, 359/237, 249, 254, 192, 499, 500, 224; 356/318, 336, 351, 367, 489; 250/201.1

(56) References Cited

U.S. PATENT DOCUMENTS

| | | | | |
|---|---|---|---|---|
| 5,825,491 A | * | 10/1998 | Cutler | 356/345 |
| 5,999,303 A | * | 12/1999 | Drake | 359/224 |
| 6,141,099 A | * | 10/2000 | Wehner et al. | 356/345 |
| 6,188,477 B1 | * | 2/2001 | Pu et al. | 356/351 |

* cited by examiner

*Primary Examiner*—Georgia Epps
*Assistant Examiner*—Tuyen Tra
(74) *Attorney, Agent, or Firm*—Oliff & Berridge, PLC

(57) ABSTRACT

The invention provides methods and systems for micro-machined tunable delay lines. Particularly, the micro-machined tunable delay lines of the present invention utilize adjustable micro-machined micro-mirrors to alter the path length traversed by an optical signal.

14 Claims, 5 Drawing Sheets

MICRO-MACHINED TUNABLE DELAY LINE

This nonprovisional application claims the benefit of the U.S. provisional application No. 60/177,025 entitled "Micromachined Polarization-State Controller" filed on Jan. 19, 2000. The Applicants of the provisional application are Nicholas J. Frigo, Evan L. Goldstein, Lih-Yuan Lin, Chuan Pu, and Robert W. Tkach. The above provisional application is hereby incorporated by reference including all references cited therein.

BACKGROUND OF THE INVENTION

1. Field of Invention

The invention relates to methods and systems that tunably delay an optical signal.

2. Description of Related Art

As optical fibers are becoming more and more ubiquitous in the optical communications community, the effects of polarization mode dispersion (PMD) caused by subtle defects of these optical fibers become increasingly important. Generally, PMD occurs when an optical signal propagates through a birefringent optical fiber causing various components of the optical signal to travel at varying velocities, thus causing a dispersion of an optical signal into multiple "images".

It is well known that PMD can be compensated for by splitting the multiple images and re-aligning the images into a single coherent optical signal. Generally, such compensation devices are formed by combining a polarization controller with an appropriately designed delay line. Unfortunately, both polarization controllers and delay lines are often unwieldly in size, difficult to tune and may be very expensive to manufacture or maintain. Therefore, there is a need to provide new methods and systems to compensate for PMD.

SUMMARY OF THE INVENTION

The invention provides methods and systems for tunable delay lines suitable for larger PMD compensation devices. Particularly, the invention provides compact and inexpensive micro-machined tunable delay lines using adjustable micro-mirrors to tunably alter a path length traversed by an optical signal.

The combination of a polarization-state controller and the tunable delay line enables the components of a PMD-affected optical signal to be appropriately manipulated to compensate for PMD effects. For example, a dispersed optical signal, after having its polarization-state suitably altered, can be split into its fast and slow components. The fast component can then be delayed relative to the slow component, by controllably manipulating its path length via one or more adjustable micro-machined micro-mirrors. After appropriately delaying the fast component, the delayed fast component is combined with the slow component to provide an optical signal whose slow and fast components are substantially re-aligned with each other. Thus, the dispersing effects of PMD can be significantly compensated for.

Other features and advantages of the present invention are described below and are apparent from the accompanying drawings and from the detailed description which follows.

BRIEF DESCRIPTION OF THE DRAWINGS

The invention is described with regard to the following figures, wherein like numbers reference like elements, and wherein.

DETAILED DESCRIPTION OF PREFERRED EMBODIMENTS

Optical fibers are ideally designed and manufactured to have cylindrically uniform properties throughout the length of the fibers. However, inconsistencies in manufacturing, laying, and environmental conditions can mechanically perturb the structure of an optical fiber to result in a non-uniform, non-cylindrical contour, such as a corkscrew or elliptic shape. As a result of these imperfections, an optical signal traversing such optical fibers can undergo a polarization sensitive dispersing phenomenon commonly referred to as polarization mode dispersion (PMD).

It is well understood in the optical transmission arts that some of the deleterious effects of PMD can be compensated for by combining a polarization-state controller with a delay line such that the "fast" components of an optical signal are delayed relative to the "slow" components and by merging the two components to form a single compensated optical signal.

Unfortunately, conventional polarization controllers and delay line devices can be unwieldy in size, operation, complexity and cost. Further, most delay line devices provide only fixed delay times. However, by applying micro-machine technology to either or both the various polarization controllers and delay line devices, compact and powerful PMD compensators can be produced.

Figure 1:
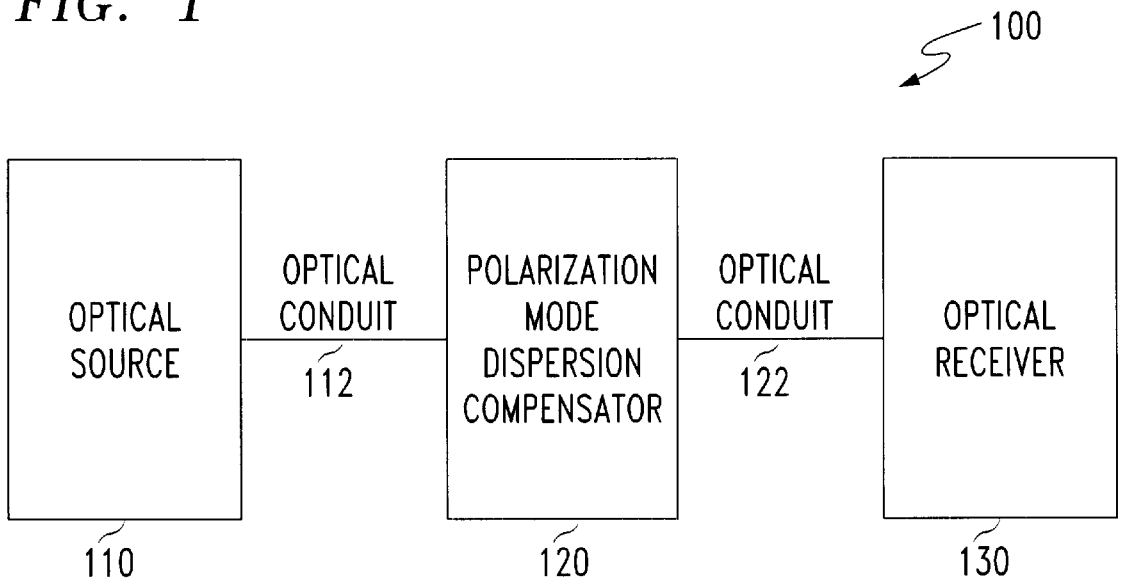
FIG. 1 is a block diagram of an exemplary optical transmission system containing a polarization mode dispersion compensator.

FIG. 1 illustrates a block diagram of an exemplary optical transmission system 100. The system 100 includes an optical source 110, a polarization mode dispersion compensator 120 and an optical receiver 130.

In operation, the polarization mode dispersion compensator 120 can receive optical signals from the optical source 110 via the optical conduit 112, compensate for PMD in the optical signals, and then provide the compensated optical signals to the optical receiver 130 via the optical conduit 122. The optical receiver 130 can also send commands, error conditions or other information to the PMD compensator 120, via the optical conduit 122 or by other means such as a separate conduit to provide controllable adjustment of the effects of the PMD compensator 120 on the optical signals. Similarly, the PMD compensator 120 itself may include one or more sensors and feedback controls to provide controllable adjustment.

The optical source 110 can be any of a number of different types of optical sources such as a computer with optical transceivers, or any other known or later developed combination of software and hardware capable of generating, relaying or recalling from storage any information capable of being transmitted in an optical signal. The optical receiver 130 can likewise be any one of a number of different types of optical receiving devices such as computers with optical transceivers, or any other known or later developed combination of software and hardware capable of receiving, relaying or otherwise sensing any information capable of being received in an optical signal.

The optical conduits 112 and 122 can be any of a number of known or later developed optical transmission media, such as optical fibers, lenses, collimators, filters, free space, etc., such that an optical signal can propagate through without departing from the spirit and scope of the present invention.

Figure 2:
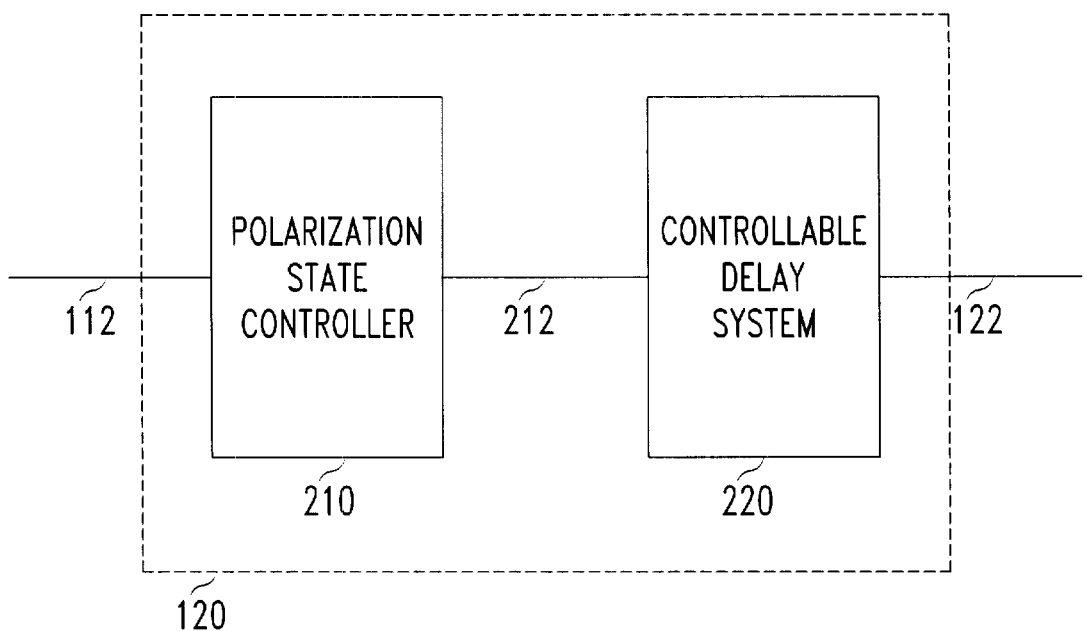
FIG. 2 is a block diagram of the polarization mode dispersion compensator of FIG. 1.

FIG. 2 is a block diagram of the polarization mode dispersion (PMD) compensator 120 of FIG. 1. The PMD compensator 120 contains a polarization-state controller 210 and a tunable (or controllable) delay system 220. In operation, one or more optical signals are received by the polarization-state controller 210 via conduit 112. The polarization-state controller 210 then adjusts the state of polarization of the received optical signals and provides the adjusted optical signal to the tunable delay system 220.

The tunable delay system 220 receives the adjusted optical signal, splits the adjusted optical signal into its fast and slow components, delays the fast components relative to the slow components such that the fast and slow components are substantially aligned, recombines the fast and slow components to produce a compensated optical signal and provides the compensated optical signal to optical conduit 122.

The exemplary polarization-state controller 210 is a micro-machined device affixed to one or more substrates. While the exemplary polarization-state controller 210 is a micro-machined device, it should be appreciated that the polarization-state controller 210 can be any other known or later developed device capable of receiving an optical signal, appreciably adjusting the state of polarization of the optical signal and providing the adjusted optical signal to the tunable delay system without departing from the spirit and scope of the present invention.

The tunable delay system 220 is also a micro-machined device affixed to a single substrate and, in various exemplary embodiments, is affixed to the same substrate as the polarization-state controller 210. However, the tunable delay system 220 can be any other known or later developed device or system capable of receiving an optical signal, and substantially aligning the fast and slow components of the optical signal to produce a compensated optical signal without departing from the spirit and scope of the present invention.

Figure 3:
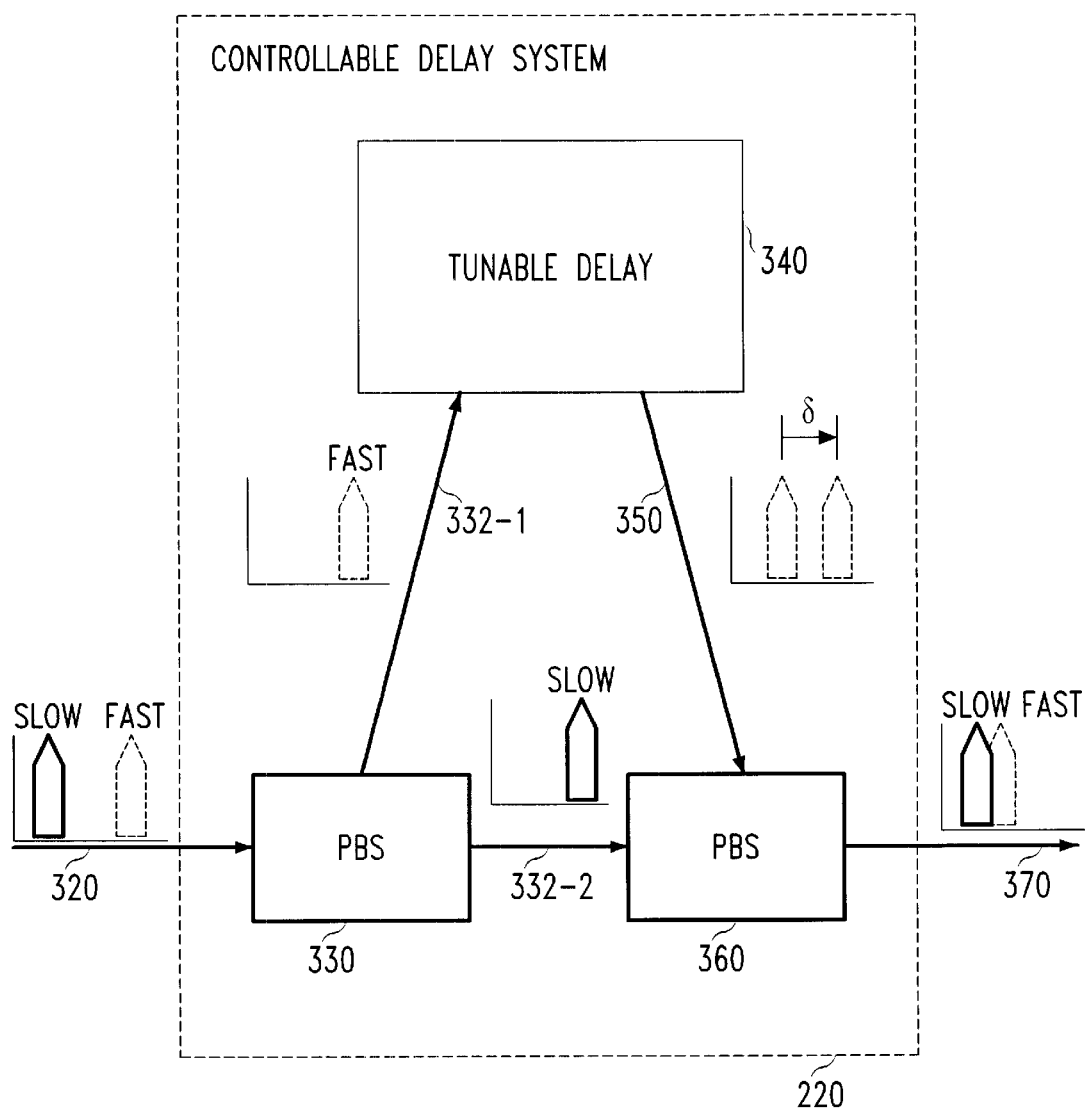
FIG. 3 is a block diagram of the controllable delay system of FIG. 2.

FIG. 3 is a block diagram of the tunable delay system 220 of FIG. 2. The exemplary tunable delay system 220 includes a pair of polarization-beam-splitters (PBSs) 330 and 360 and a tunable delay 340. In operation, the controllable delay system 220 can receive an optical signal corrupted by PMD—i.e., an optical signal dispersed into various images (represented, illustratively, as fast and slow components)—and substantially realign the fast and slow components of the optical signal to provide a compensated optical signal. To accommodate the re-alignment process, the exemplary received optical signal can have a state of polarization adjusted such that the first polarization-beam-splitter 330 can appropriately split the dispersed optical signal 320 into its fast and slow components.

The first polarization-beam-splitter 330, situated in the path of the polarizationstate-adjusted optical signal 320, receives the adjusted optical signal and splits the received optical signal into two beams, a fast component 332-1 and a slow component 332-2. The tunable delay 340 receives the first component, effectuates a variable temporal delay on the fast component 332-1 by variably controlling the path length of the fast component 332-1 and provides the delayed fast component 350 to the second polarization-beam-splitter 360. The second polarization-beam-splitter 360, situated in the paths of both the slow component 332-2 and the delayed fast component 350, receives and combines the two optical components 332-2 and 350 to result in a compensated optical signal 370 such that the fast component is substantially adjusted to coincide with the slow component.

The exemplary PBSs 330 and 360, along with the tunable delay 340, are micro-machined devices affixed to a single substrate. The exemplary PBSs 330 and 360 are silicon plates oriented such that a received optical beam will fall incident at the Brewster angle, which is 74° for silicon. While the exemplary PBSs 330 and 360 are composed of silicon, it should be appreciated that the materials can vary as a design choice or as otherwise required. It should be further appreciated that the materials and design of the tunable delay 340 can similarly vary as a design choice or as otherwise required. Finally, while the exemplary PBSs 330 and 360 and tunable delay 340 are manufactured using CHRONOS INTEGRATED MICROSYSTEMS® MUMPs® process with precision side latches, any micro-machining technology capable of producing the general configuration of the tunable delay system 220 can be used without departing from the spirit and scope of the present invention.

Although FIG. 3 illustrates unimpeded paths from the PBSs 330 and 360 to and from the tunable delay 340, and between the PBSs 330 and 360, it should be appreciated that various devices such as fixed or adjustable micro-mirrors can be placed in between the PBSs 330 and 360 and the tunable delay 340 to provide fixed delays or otherwise affect the various optical signals 320, 332-1, 332-2, 350 and 370 without departing from the spirit and scope of the invention. For example, a first micro-mirror could be placed in the path of the slow component to provide a fixed-delay while one or more second fixed micro-mirrors can be placed in the path of the delayed fast component to adjust the angle at which the second PBS 360 receives the delayed fast component.

Figure 4:
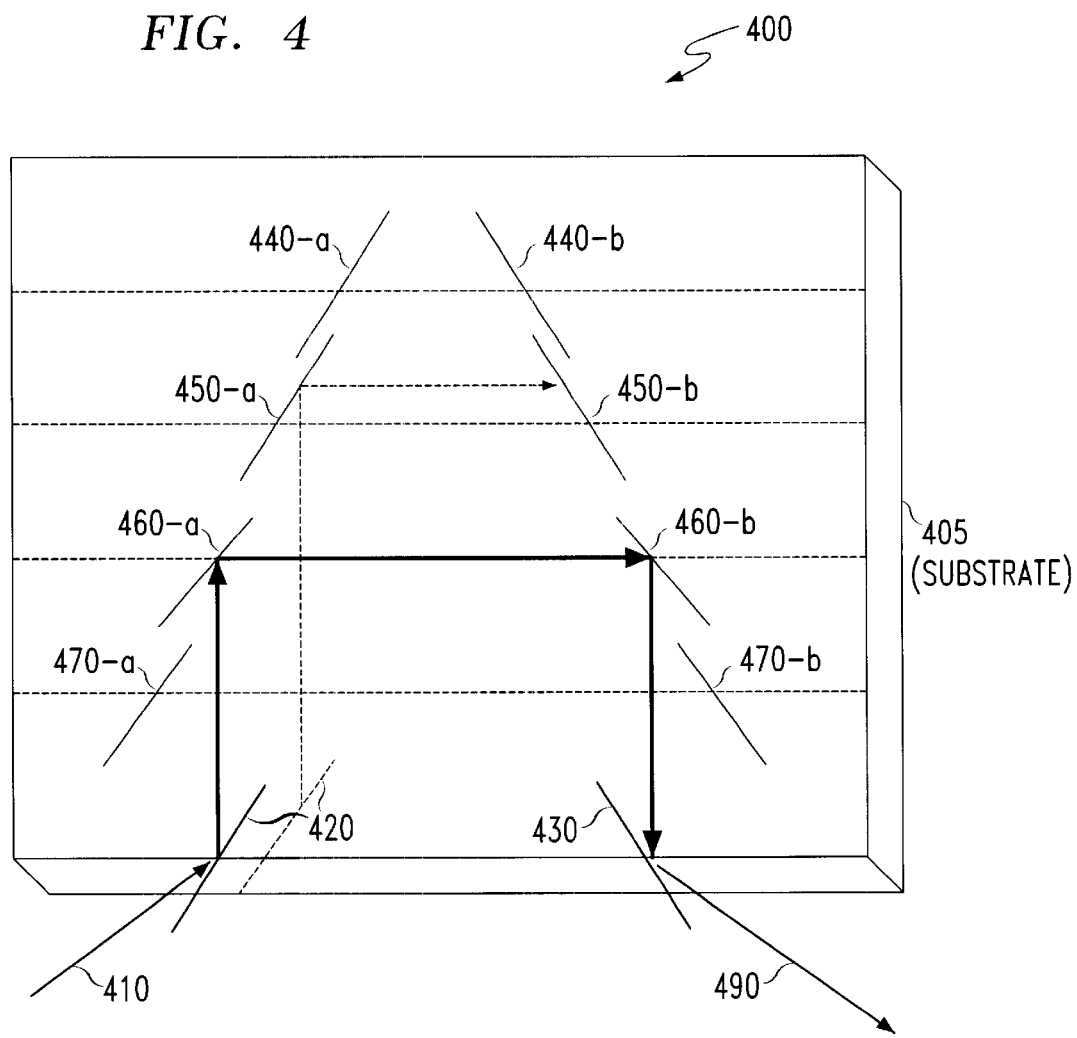
FIG. 4 is a diagram depicting an exemplary micro-machined, step-wise tunable delay line according to an embodiment of FIG. 2.

FIG. 4 is a first exemplary tunable delay 400 according to the controllable delay system 220 of FIG. 3. The tunable delay 400 contains a first and second adjustable mirror 420 and 430, affixed to a substrate 405 and a number of fixed paired-mirrors 440–470. In operation, the first adjustable mirror 420 receives an optical signal 410, such as a fast component of an optical signal corrupted by PMD, reflects the optical signal 410 to one of a number of left-half mirrors 440a–470a of the paired-mirrors 440 to 470, which reflects the optical beam to a respective right-half mirror 440b–470b, which reflects the optical beam to the second adjustable mirror 430 to produce a delayed optical beam 490.

From FIG. 4, it is easily seen that as the angle and/or position of the adjustable micro-mirrors 420 and 430 is altered, the path of the optical signal 410 can be directed to any of the paired-mirrors 440, 450, 460, and 470, therefore enabling discretely adjustable path lengths. Accordingly, if the exemplary optical signal 410 is a fast component of an optical signal corrupted by PMD, the "time-of-arrival" of the fast component 410 can be temporally shifted such that the fast component can be adjustably aligned with a corresponding slow component. As discussed above, upon exiting the tunable delay 400, a temporally aligned fast component can be combined with its respective slow component to form a compensated optical signal.

To control the path length of the received optical signal 410, the exemplary tunable delay 400 can adjust the positions and/or angles of the adjustable mirrors 420 and 430. For example, in various embodiments the adjustable mirrors 420 and 430 can be micro-machined micro-mirrors each secured to an electrode plate (not shown) by a mirror frame and torsion beams (also not shown). In a first exemplary embodiment, torsion beams are affixed to one end of each of the adjustable micro-mirrors 420 and 430 such that the adjustable micro-mirrors move as hinged levers move when a voltage bias is applied to a respective electrode-plate. That is, the first adjustable micro-mirror 420 can controllably deflect the received optical signal 410 to any of the paired-mirrors 440–470 as it rotates through some first range $\theta_1$ to $\theta_2$. Accordingly, the second adjustable micro-mirror 430 can be similarly adjusted such that an optical signal reflected from one of the paired-mirrors 440–470 can be suitably deflected to another device such, as a polarization beam splitter, as it rotates through a second range.

In other exemplary embodiments, the torsion beams securing the adjustable micro-mirrors 420 and 430 can be configured such that a voltage bias on a respective electrode plate will not substantially change the angle of the adjustable micro-mirror 420 or 430, but instead laterally move each micro-mirror 420 and 430. For example, the first adjustable micro-mirror 420 can be adjustably positioned towards a center axis of the substrate 405 such that the received optical signal 410 is deflected to left-hand mirror 450a, as opposed to any of the other left-hand mirrors 440a, 460a or 470a. Accordingly, the second adjustable micro-mirror 430 can be similarly repositioned to receive the optical signal from right-hand mirror 450b, as opposed to any of the other right-hand mirrors 440b, 460b or 470b and deflect the optical signal to an external device.

In still other exemplary embodiments, it should be appreciated that the adjustable micro-mirrors 420 and 430 can be configured such that both their positions and angles can be simultaneously adjusted to form other delay paths. For example, the position and angle of the first adjustable micro-mirror 420 can be controlled to deflect the optical signal to left-hand mirror 460a. However, because the incident angle of the optical signal 410 can be controlled relative to left-hand mirror 460a, the optical signal can be controllably directed to reflect from left-hand mirror 460a to any of the right-hand mirrors 440b–470b, as opposed to only right-hand mirror 460b. The second adjustable micro-mirror 430 can be similarly configured to receive the optical signal 410 from any of the right-hand mirrors 440b–470b and direct it to an external device.

The exemplary adjustable micro-mirrors 420 and 430 and paired-mirrors 440–470, like the PBSs of FIG. 3, are silicon devices manufactured using CHRONOS INTEGRATED MICROSYSTEMS MICROSYSTEMS® MUMPs® process with precision side latches. However, any micro-machining technology capable of producing the general configuration of the tunable delay 400 can be used without departing from the spirit and scope of the present invention. Furthermore, while the exemplary tunable delay 400 has four paired-mirrors 440–470, it should be appreciated that any number of pairedmirrors can be used as desired or otherwise required by design. Furthermore, in various embodiments the various paired-mirrors 440–470 can be replaced with a single mirror having a complex shape such as a curved and/or polygon shaped surface such that various paths can be implemented. Still further, each pair of mirrors of the paired-mirrors 440–470 can be replaced with any number of mirrors, e.g., three or more micro-mirrors may be used in each set of mirrors, if desired.

In still other exemplary embodiments, it should be appreciated that each set of paired-mirrors 440–470 can be adjustable micro-mirrors similar to adjustable micro-mirrors 420 and 430 to add further degrees of freedom in controlling the path length of an optical beam.

Figure 5:
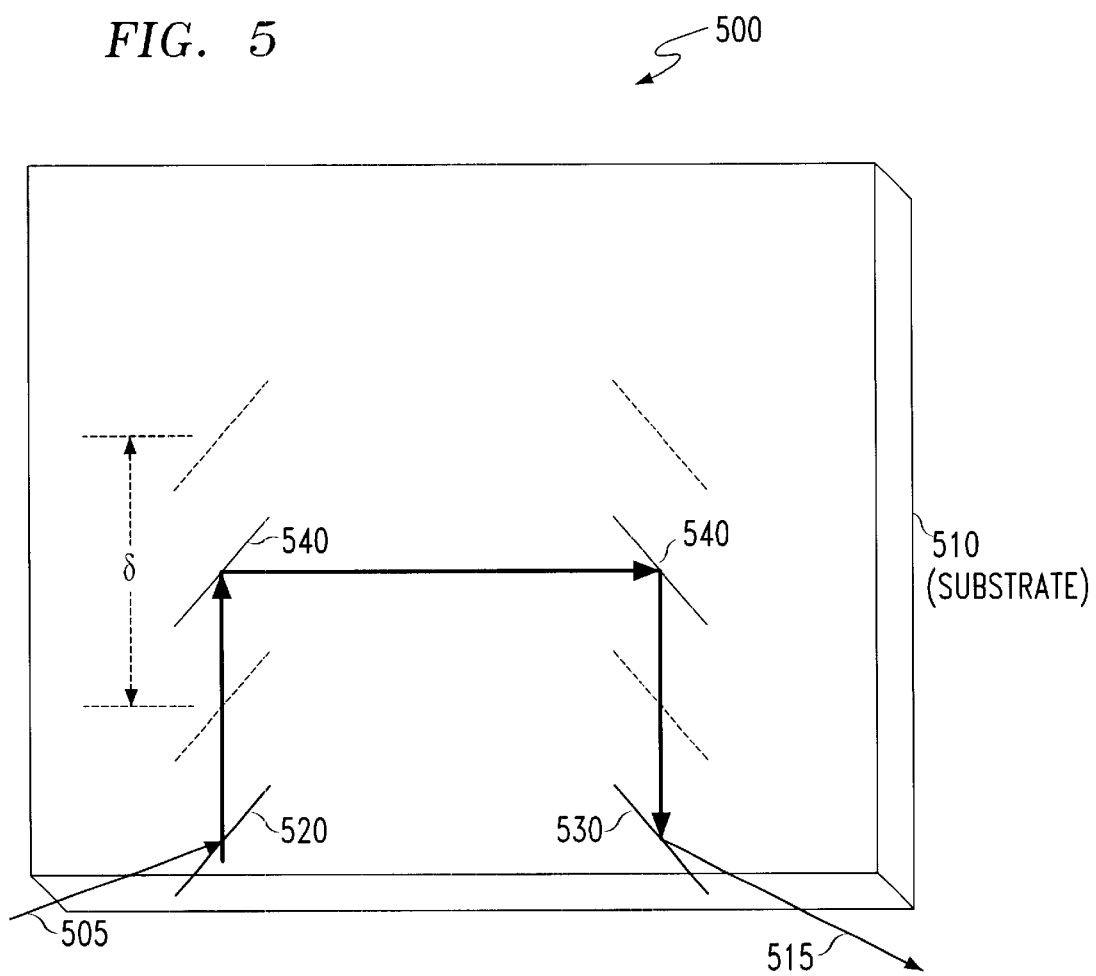
FIG. 5 is a diagram depicting an exemplary micro-machined continuously tunable delay line according to an embodiment of FIG. 2.

FIG. 5 is a second exemplary tunable delay 500 according to the present invention having a first and second fixed mirror 520 and 530 and an adjustable paired-mirror 540. As similarly described in FIG. 4, the second tunable delay 500 can adjust the path length of an optical signal 505, such as a fast component of a dispersed optical signal, to provide a delayed optical signal 515. However, while the exemplary paired-mirrors 440–470 of FIG. 4 are discretely positioned to provide a number of discrete delays, the second tunable delay 500 can provide a continuously tunable path length delay. That is, as the adjustable paired-mirror 540 is controllably positioned along its range δ, the path length of the received optical signal is continuously varied by as much as 2δ.

Similarly to the fixed mirrors of FIG. 4, it should be appreciated that mirrors 520 and 530 can also be adjustable devices that can be adjustably rotated and/or translated to provide further degrees of freedom. Furthermore, it should be appreciated that in various embodiments, that mirrors 520 and 530 and/or the mirrors of the adjustable paired-mirrors 540 can be adjustably rotated, together or separately, to provide still further degrees of control. Still further, it should be appreciated that the surfaces of the adjustable paired-mirrors 540 and/or fixed mirrors 520 and 530 can have complex shapes as desired or otherwise advantageous by design.

While FIG. 5 illustrates a single mirror pair 540 that is adjustably translatable to any point in the range bounded by 2δ, it should be appreciated that the embodiment of FIG. 5 can be modified with additional mirror pairs placed within the range bounded by 2δ, and actuated to provide variable step-wise delays. That is, mirrors 540 and mirror sets (not shown) can be situated in the substrate 510 at points corresponding to predetermined path lengths within the path of an optical beam, and the mirrors 540 and mirror sets (not shown) may be controllably raised out of the substrate into the path of the optical beam or controllably lowered into the substrate out of the path of the optical beam, to provide variable step-wise path delay. Various micro-machined systems and devices for raising and lowering micro-machined mirrors in and out of a substrate are described in Lin et al., "Free-Space Micromachined Optical Switches with Submillisecond Switching Time for Large-Scale Optical Crossconnects", *IEEE Photonics Techology Letters,* Vol. 10, No. 4, April 1998, pp. 525–527, herein incorporated by reference in its entirety.

Figure 6:
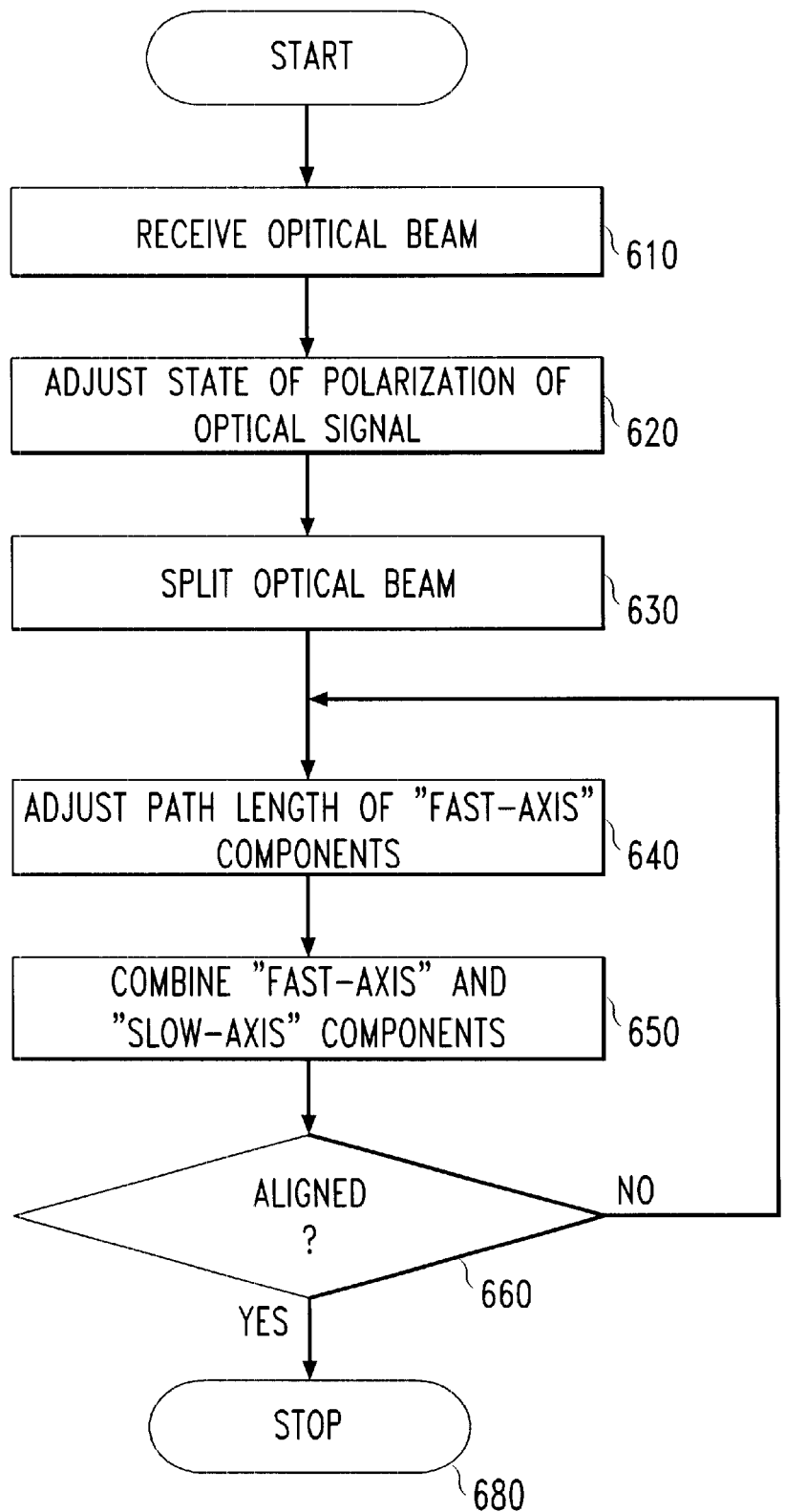
FIG. 6 is a flow chart outlining an exemplary technique for providing a tunable delay of an optical signal according to various exemplary embodiments of the present invention.

FIG. 6 is a flow chart outlining an exemplary technique for adjusting the path length of an optical beam according to various exemplary embodiments of the present invention. Beginning in step 610, a dispersed optical signal is received. Next, in step 620, the state of polarization of the received optical signal is adjusted such that a subsequent beam-splitter receiving the adjusted optical signal can suitably split the adjusted optical signal into its fast and slow components. Then, in step 630, the adjusted optical signal is split into its fast and slow components. While the exemplary technique uses a micro-machined polarization-beam-splitter made of silicon affixed to a single substrate, it should be appreciated that any known or later discovered device, system or technique useful to split an optical signal into its fast and slow components can be used without departing from the spirit and scope of the present invention. The process continues to step 640.

In step 640, the path length of the fast component is controllably lengthened or shortened according to a desired or estimated delay such that the fast component, suitably delayed, can be combined with its respective slow component to substantially produce a single image, i.e., compensate for PMD. While the exemplary technique controllably alters the fast component, it should be appreciated that, in various exemplary embodiments, the fast component can be delayed by a fixed amount and the slow component can be controllably lengthened or shortened to align the fast and slow components. Furthermore, while the exemplary technique uses one or more adjustable micro-machined micro-mirrors affixed to a single substrate controlled using electrode plates and torsion beams to control path length, it should be appreciated that any known or later developed technique useful to vary the path length of an optical signal relative to another optical signal can be used without departing from the spirit and scope of the present invention. The process continues to step 650.

In step 650, the delayed fast component is combined with the slow component to produce a single optical signal. While the exemplary technique uses a polarization beam splitter similar to that used in step 630, it should be appreciated that any known or later developed technique useful to combine optical signals can be used without departing from the spirit and scope of the present invention. The process continues to step 660.

In step 660, a determination is made as to whether the fast and slow components are suitably aligned such that the combined optical signal is appreciably a single image of the original signal. If the fast and the slow components are suitably aligned, control continues to step 680 where the process stops; otherwise, control jumps back to step 640 where the path length of the fast component is further adjusted. The process continues through steps 640–660 until the fast and slow components are suitably aligned and the process stops in step 680.

It should be understood that each of the components shown in the various FIGS. 1–5 can be implemented as portions of a larger suitably structured device. Alternatively, each of the components shown in the various figures can be implemented as physically distinct components or discrete elements. Furthermore, various components of the various devices can be rearranged and combined with various other devices without departing from the spirit and scope of the present invention. It should be understood that any combination of hardware or software capable of implementing the systems of FIGS. 1–5 or the flowchart of FIG. 6 can be used without departing from the spirit and scope of the present invention.

For example, it should be appreciated that the components of the polarization mode dispersion compensator can be achieved by monolithic-integration on a substrate, or by packaging discrete chips together. Also, the actuation of the micro-mirrors is not restricted to the examples mentioned, as other micro-actuated-mirror technology can achieve optical switching or manipulation to effectuate time delaying of optical signals, i.e., the position and orientation of the various paired-mirrors can be controlled via translational substrates connected to the paired-mirrors such that the paired-mirrors are fixed to the substrate and the substrates are translated and/or rotated. Further, micro-mirror pairs can be hierarchically situated (i.e., 3-D) to provide more than two-dimensional path length adjustment.

Finally, while this invention is disclosed in the context of providing a tunable delay line for use in PMD compensation, this invention is not intended to be limited to only aiding in PMD compensation and can be used in any environment where control of a signal or beam of energy is required to be tunably delayed.

While this invention has been described in conjunction with specific embodiments thereof, it is evident that many alternatives, modifications, and variations will be apparent to those skilled in the art. Accordingly, preferred embodiments of the invention as set forth herein are intended to be illustrative and not limiting. Thus, there are changes that may be made without departing from the spirit and scope of the invention.

What is claimed is:

1. A method for controlling an optical signal, comprising:

receiving the optical signal;

splitting the received signal into a fast component and a slow component; and selectively controlling the path length of at least one of the fast and slow components;

wherein the path length is selectively controlled by one or more first micro-machine devices using a substrate, at least one or more fixed micro-machined micro-mirrors and at least one or more adjustable micro-machined micro-mirrors, and wherein selectively controlling includes:

directing a component to an adjustable micro-mirror set using a fixed micro-mirror, wherein the component can be one of the fast component or the slow component; and adjustably controlling the path length of the component using the adjustable micro-mirror set.

2. The method of claim 1, wherein selectively controlling delays the fast component relative to the slow component.

3. The method of claim 2, further comprising combining the delayed fast component with the slow component to produce a combined optical signal.

4. The method of claim 3, wherein splitting, selectively controlling, and combining substantially compensates for polarization mode dispersion (PMD) of the received optical signal.

5. The method of claim 4, further comprising altering the state of polarization of the received optical signal before splitting the received optical signal.

6. The method of claim 1, wherein the adjustable and fixed micromirrors are affixed to the first substrate.

7. An apparatus for controlling an optical signal, comprising:

a splitter that splits the optical signal into a fast component and a slow component;

a controllable delay that selectively controls the path length of one of the fast component and slow component, the controllable delay including at least one or more fixed micro-machined micro-mirrors; and a combining device that combines the controlled component with the other component;

wherein the controllable delay uses at least one adjustable micro-machined micro-mirrors situated on a substrate, wherein the controllable delay substantially aligns the fast and slow components, and wherein the at least one or more fixed micro-machined micro-mirrors directs the first component to the at least one or more adjustable micro-machined micro-mirrors.

8. The apparatus of claim 7, wherein the splitter, the controllable delay, and the combining device substantially compensate for polarization mode dispersion (PMD) of the optical signal.

9. The apparatus of claim 7, wherein at least one of the adjustable micro-machined micro-mirrors is controlled using an electrode plate.

10. The apparatus of claim 7, wherein the at least one or more adjustable micro-machined micro-mirrors is continuously adjustable to continuously alter the path length of the optical signal.

11. The apparatus of claim 10, wherein the at least one or more adjustable micro-machined micro-mirrors is actuated substantially into the substrate.

12. The apparatus of claim 7, wherein the at least one or more adjustable micro-machined micro-mirrors is adjusted based on a lateral displacement.

13. The apparatus of claim 7, wherein the at least one or more adjustable micro-machined micro-mirrors is adjusted based on an angular displacement.

14. The apparatus of claim 7, wherein the at least one or more adjustable micro-machined micro-mirrors is actuated substantially out of the substrate.

* * * * *